United States Patent [19]

Figueras

[11] Patent Number: 4,806,128
[45] Date of Patent: Feb. 21, 1989

[54] PROCESS FOR PREPARING VAT PIGMENT DYES

[75] Inventor: Juan M. Figueras, Barcelona, Spain

[73] Assignee: Merck Patent Gesellschaft mit Beschrankter Haftung, Darmstadt, Fed. Rep. of Germany

[21] Appl. No.: 917,457

[22] Filed: Oct. 10, 1986

[30] Foreign Application Priority Data

Oct. 10, 1985 [DE] Fed. Rep. of Germany ....... 3536168

[51] Int. Cl.$^4$ .................. C09B 47/04; C09C 3/08; C09D 5/36
[52] U.S. Cl. ................................. 8/650; 8/625; 8/626; 8/632; 8/637.1; 8/653; 8/661; 8/675
[58] Field of Search ................................. 8/650, 653

[56] References Cited

U.S. PATENT DOCUMENTS 3,761,297 9/1973 Figueras.

FOREIGN PATENT DOCUMENTS 3520806 12/1986 Fed. Rep. of Germany.
1000531 5/1961 United Kingdom.

*Primary Examiner*—A. Lionel Clingman
*Attorney, Agent, or Firm*—Millen & White

[57] ABSTRACT

A process for preparing pigment dyes comprising reducing a colloidal dispersion of an impure dye to form a solution of the leucobase, introducing into this solution a finely divided substrate and, by adding an oxidizing agent, oxidizing the leucobase to form the vat dye, which thereby precipitates and deposits on the substrate.

20 Claims, No Drawings

PROCESS FOR PREPARING VAT PIGMENT DYES

BACKGROUND OF THE INVENTION

The invention relates to a process for preparing insoluble and safe pigment dyes by first preparing a colloidal dispersion of a vat dye, preferably from the group comprising the anthraquinone dyes, the indigoid dyes and the phthalocyanine dyes, in an aqueous alkaline medium by agitation to form a solution of the leucobase of the dye. Under conditions which rule out premature oxidation, a finely divided substrate is introduced into this solution. An oxidizing agent is then added to the solution to oxidize the leucobase to form the dye, which thereby precipitates and deposits on the substrate. After the oxidation, a strong acid in excess is added to the alkaline medium. The dye-coated substrate is then separated from the medium, washed and dried.

British Pat. No. 1,000,531 already discloses a process of this kind, wherein vat dyes are reduced in alkali solution to form the corresponding leuco compound. By mixing the solution with an aqueous dispersion of a pigment and thereafter oxidizing the leuco compound, the dye is deposited on the pigment. The pigment used therein is a sodium aluminum silicate. The dye-coated pigment thus obtained is used for industrial purposes, in particular in thermoplastics, rubber, printing inks, lacquers and paints.

German Pat. No. 2,044,104 discloses a similar process, where the pigment or substrate to be coated used is titanium dioxide and where the combination of the high hiding power of the titanium dioxide with the color stability of vat dyes is emphasized as particularly advantageous. Since the pigment dye is not only insoluble but also safe, it can indeed be ingested with foodstuffs or medicaments or be brought into contact with the human body by means of cosmetics. Therefore, the pigment dye is suitable for use as a coloring additive in foodstuffs, medicaments, cosmetics, perfumeries, toys or personal accessories.

In particular, in the latter mentioned areas of use it is an absolute requirement that the pigment dye used be free of harmful impurities. Examples of impurities which are not tolerable for these uses are the heavy metals barium, lead and arsenic and also organic impurities such as, for example, aromatic amides, polycyclic aromatic hydrocarbons and intermediates from the synthesis of the dyes.

It was therefore customary in the field to start from very pure dyes in order to obtain safe, pure pigment dyes.

However, this has the disadvantage that these grades of dye are very costly, evidently as a result of expensive purifications. Although the dye is applied to the substrate to be coated only as a coating, this nonetheless constitutes a considerable cost factor which pushes up the cost of the completed pigment dye.

There thus exists a need for a process whereby these pigment dyes can be prepared in a less costly manner without impairing the quality, in particular the purity and safeness, of the pigments.

SUMMARY OF THE INVENTION

It is an object of this invention to provide a process of preparing pigment dyes from low grade dyes containing impurities.

It is another object of this invention to provide a low cost process for producing high quality pigment dyes.

Another object of this invention is to provide an inexpensive process for preparing pigment dyes for use in cosmetics, foodstuffs, and medicaments.

Upon further study of the specification and appended claims, further objects and advantages of this invention will become apparent to those skilled in the art.

It has now been found that it is surprisingly possible to use as the starting material even a technical-grade dye which contains large amounts of impurities. Surprisingly, the process of precipitating the dye onto the substrate is evidently accompanied by a process of purification to the effect that the impurities originally present in the dye are not precipitated onto the substrate, but either remain in solution or else are so finely dispersed as to pass through the filter used for separating off the pigment dye and hence can be removed by washing the pigment dye suspension.

The invention therefore provides a process for preparing insoluble and safe pigment dyes by first preparing a colloidal dispersion of a vat dye, preferably from the group comprising the anthraquinone dyes, the indigoid dyes and the phthalocyanine dyes, in an aqueous alkaline medium by agitation and heating. The finely divided vat dye is then reduced to form a solution of the leucobase and, under conditions which rule out premature oxidation, a finely divided substrate is introduced into this solution. An oxidizing agent or agents are then added to the solution to oxidize the leucobase to form the vat dye causing the vat dye to thereby precipitate and deposit on the substrate. After the oxidation, a strong acid is added to the alkaline mixture in excess and the dye-coated substrate is separated off, washed and then dried. The process is characterized by the use of a vat dye which is in an impure form containing only about 40 to 70% by weight of the pure dye.

Thus, this invention provides in a process for preparing an insoluble and safe pigment dye from a mixture of a finely divided substrate and an aqueous solution of a leucobase of a vat dye, said solution formed by reducing a colloidal dispersion of a vat dye, comprising adding at least one oxidizing agent to said mixture to oxidize the solution and form the vat dye thereby causing said vat dye to precipitate and coat said substrate, the improvement wherein the vat dye is initially used in the process in an impure form containing at least about 30–60% impurities and said resultant coating on the substrate contains said dye with a substantially increased purity.

The process according to the invention is all the more astonishing in the light of the fact that the technical dye grades used in accordance with the invention frequently have a dye content of only about 40 to 70%, while the remainder comprises impurities. It was not foreseeable that, despite these unfavorable preconditions, it is possible to obtain pigment dyes which are highly suitable for cosmetic purposes and also for medicaments and foodstuffs.

A principal advantage of the invention is therefore that it is possible to prepare high-grade products from very inexpensive starting materials. In addition, the process according to the invention is relatively widely applicable in that very many different substrates can be used as base materials and, also a wide selection of dyes is available.

Highly suitable substrates include for example the previously used titanium dioxide pigments, but also many others kinds of finely divided material such as, for example, other metal oxides, finely divided, porous or non-porous silica gels, aluminum oxide and aluminum and magnesium silicates such as talc and kaolin. It is also particularly advantageous to use the platelet particles known as pearlescent pigments, such as, for example, mica platelets coated with metal oxides, in particular titanium oxide and bismuth oxychloride and other pearlescent pigments. Such pearlescent pigments are known for example from German Pat. Nos. 1,467,468, 2,214,545 and 2,552,572. Very interesting effects are obtained in particular with relatively thin dye coatings where the interference color of the pearlescent pigment shows through.

The substrates are used according to the invention in finely divided form, in particular in particle sizes of about 0.01 to 100 μm, the lower range of about 0.01 to 1 μm being preferred in the case of using irregularly shaped substrates such as, for example, titanium dioxide or silicic acid anhydride, while the platelet-shaped pearlescent pigments are used preferably in particles sizes of about 5 to 50 μm.

In connection with the present invention it is possible to use all vat dyes, i.e. dyes which can be converted by reduction into a water-soluble form from which, by oxidation, the insoluble dye can then be recovered. Typical representatives are, for example, indigo and other indigoid dyes, Indanthrene and other anthraquinonoid dyes, phthalocyanine and naphthalene dyes and also sulfur dyes of the type of Hydron Blue, Immedial dyes and leuco vat dye esters. A list of commercially available vat dyes is found in: Textilbetrieb April 1978, page 67.

The conditions employed in coating the substrate with the vat dye are known per se, for example from German Pat. No. 2,044,104. First, the vat dye in the form of a fine, aqueous suspension is vatted in alkaline solution by reduction with a reducing agent such as sodium hydrogensulfite, sodium dithionite, sodium hydroxymethanesulfonate or boron hydrides, preferably sodium hydrogensulfite. This is preferably accomplished in an approximately 2 to 20, in particular about 4 to 10% by weight strength suspension of the dye per se (ignoring impurities) and at elevated temperature up to below the boiling point of the suspension, in particular at about 80° to 95° C.

To the vat thus prepared is then introduced a substrate, preferably—to avoid premature oxidation of the dye—avoiding at this stage of the process the stirring in of air and, if necessary, even working in a protective gas atmosphere. The amount of substrate added depends on the amount of the dye per se present in solution and on the desired degree of coating of the substrate. In general, sufficient substrate will be added to give a weight ratio of vat dye to substrate of about 1:1 to 1:20.

The subsequent oxidation can be carried out in conventional manner, for example by stirring or blowing in air, oxygen or ozone, and, where appropriate, under elevated pressure. Alternatively or in addition to the previously mentioned oxidizing agents, hydrogen peroxide, for example, or another oxidizing agent can be added. For example, oxidation can be performed by first stirring in air and then adding an additional oxidizing agent such as hydrogen peroxide or ozonized air. Preferably, the oxidation is likewise carried out at elevated temperature, for example at about 60° to 90° C., in particular at about 70° to 80° C. The rate at which the insoluble vat dye is formed in the course of the oxidation is also the rate at which the insoluble vat dye is deposited on the surface of the substrate coating the latter with a homogenous layer.

After completion of the oxidation the strongly alkaline suspension is acidified with a strong acid such as, for example, hydrochloric acid, sulfuric acid, nitric acid or even mixtures of these acids, in particular a mixture of hydrochloric and nitric acid, to a pH of preferably below about 1 and is stirred for a further period at elevated temperature, preferably above about 70° C. The dye-coated pigment formed can then be separated off, washed with water and dried. In particular, in the production of grades of pigment dyes which are suitable for use in foodstuffs and medicaments, the pigment dyes should be washed very carefully. An indication that sufficient washing of the pigment dye has been performed is, for example when the conductivity of the wash liquor does not change any more.

The pigment dye is then dried at a temperature of about 100° to 120° C. for approximately 5 to 30 hours. Preferably, the temperature is raised in the final phase of the drying process to about 140° to 150° C. for at least a few minutes. The dried product is ground to break up agglomerates and then classified. In the case of dye coated platelet-shaped pearlescent pigments it is of course necessary to take care that the pigment particles are not destroyed by the grinding and classification steps.

The pigment dye is then immediately usable for all uses, for example in lacquers and paints. In particular, the pigment dye is immediately usable in foodstuffs and medicaments and also in cosmetics, so that a valuable new process for preparing these high-grade pigment dyes is available.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the preceding text and the following examples, all temperatures are set forth uncorrected in degrees Celsius and all parts and percentages are by weight; unless otherwise indicated.

EXAMPLE 1

10 l of water at about 90° to 95° C. are successively charged, while gently stirring, with 400 g of the dye Rosa B (Color Index No. 73360) in a technical grade which contains about 50% pure dye, 550 g of aqueous potassium hydroxide solution having a density of 40° baume and a solution of 200 g of sodium hydrogensulfite in 1000 ml of water. In the vat thus prepared, 2000 g of silver-colored pearlescent pigment which consists of mica coated with titanium oxide, are dispersed and air is then introduced by being vigorously stirred into the suspension, while a temperature of about 75° to 80° C. is maintained. After about 15 minutes, 800 g of 15% by weight strength hydrogen peroxide are additionally added at a rate of about 20 ml/min. After about 10 minutes of subsequent stirring at about 85° to 90° C., about 600 g of 35% strength hydrochloric acid are added to set a pH value of 0.5, while the temperature is maintained at about 70° C. After about 2 hours of acid treatment, the dispersed colored pigment is separated off and is washed with water until the conductivity of the wash water remains constant. The product is then dried at 110° C. for about 20 hours and at 145° to 150°

C. for about 3 to 4 hours, is divided in a drum and is classified.

EXAMPLE 2

To obtain a higher coating with dye, the process of Example 1 is repeated with the same amount of pearlescent pigment, except that the vat used has been prepared by adding to 12 l of water amounts of dye, potassium hydroxide solution and sodium hydrogensulfite which are respectively double those used in Example 1. The amount of 15% by weight strength hydrogen peroxide added in the course of the oxidation is 1200 g.

EXAMPLE 3

Analogously to Example 1, a vat is prepared from 20 l of water, 2000 of Rose B (about 50% pure), 2800 g of potassium hydroxide solution and 1000 g of sodium hydrogensulfite in 5 l of water, and 2000 g of titanium dioxide pigment are dispersed therein. To this are added in the course of 60 minutes 2400 g of approximately 30% strength hydrogen peroxide and 4800 g of 30% strength ammonia solution. This is followed by neutralizing with hydrochloric acid and acidification with 2400 g of 35% strength hydrochloric acid and 800 g of 60% strength nitric acid and approximately 2 hours of stirring at 90° to 95° C., whereafter the colored pigment is separated off and washed and dried, the last two steps being carried our as described in Example 1. Grinding and classifying gives a very pure colored pigment of high hiding power.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for preparing an insoluble and safe pigment dye from a mixture of a finely divided substrate and an aqueous solution of a leucobase of a vat dye, said solution formed by reducing a colloidal dispersion of a vat dye, said process comprising adding at least one oxidizing agent to said mixture to oxidize the solution and form the vat dye thereby causing said vat dye to precipitate and coat said substrate, the improvement wherein the vat dye is initially used in the process in an impure form containing at least about 30–60% impurities and said resultant coating on the substrate contains said dye at a purity which is substantially greater than the purity of the initial vat dye.

2. A process according to claim 1, wherein said colloidal dispersion is prepared by dispersing said impure vat dye in an aqueous alkaline medium.

3. A process according to claim 1, wherein said colloidal dispersion of vat dye is reduced by sodium hydrogensulfite, sodium dithionite, sodium hydroxymethane sulfonate or a boron halide.

4. A process according to claim 1, wherein said vat dye is an anthraquinone dye, an indigoid dye, a phthalocyanine dye, or a naphthalene dye.

5. A process according to claim 2, wherein after the solution has been oxidized, the medium is acidified by addition of an acid.

6. A process according to claim 5, wherein the medium is acidified to a pH below about 1.

7. A process according to claim 5, wherein the acid is hydrochloric acid, sulfuric acid, nitric acid or a mixture thereof.

8. A process according to claim 1, wherein said mixture is formed by adding said substrate to said solution under conditions whereby premature oxidation of the leucobase is substantially prevented.

9. A process according to claim 1, wherein said substrate is a metal oxide, a porous or non-porous silica gel, an aluminum silicate, a magnesium silicate or a pearlescent pigment.

10. A process according to claim 1, wherein said substrate is titanium dioxide.

11. A process according to claim 1, wherein addition of said at least one oxidizing agent is performed by adding air to the solution and subsequently adding hydrogen peroxide or ozonized air.

12. A process according to claim 1, wherein the ratio of pure vat dye to substrate added is about 1:1 to 1:20.

13. A process according to claim 1, wherein the colloidal dispersion is approximately 2 to 20% by weight pure vat dye.

14. A process according to claim 1, wherein said solution is oxidized at a temperature of about 60° to 90° C.

15. A process according to claim 1, wherein said finely divided substrate has a particle size of about 0.01 to 100 μm.

16. A process according to claim 1, wherein the dye-coated substrate is separated from said solution, washed and then dried.

17. A process according to claim 5, wherein the dye-coated substrate is separated from said medium, washed and dried.

18. A process according to claim 17, wherein said dye-coated substrate is washed with water.

19. A process according to claim 18, wherein washing of the dye-coated substrate is performed until the wash water conductivity remains substantially constant.

20. A process according to claim 17, wherein said dye-coated substrate is dried at a temperature of about 100° to 200° C.

* * * * *